Feb. 26, 1963
G. ALFIERI
3,079,170
AIR SPRING CONTROL VALVE FOR MOTOR VEHICLES
Filed April 8, 1959
2 Sheets-Sheet 1
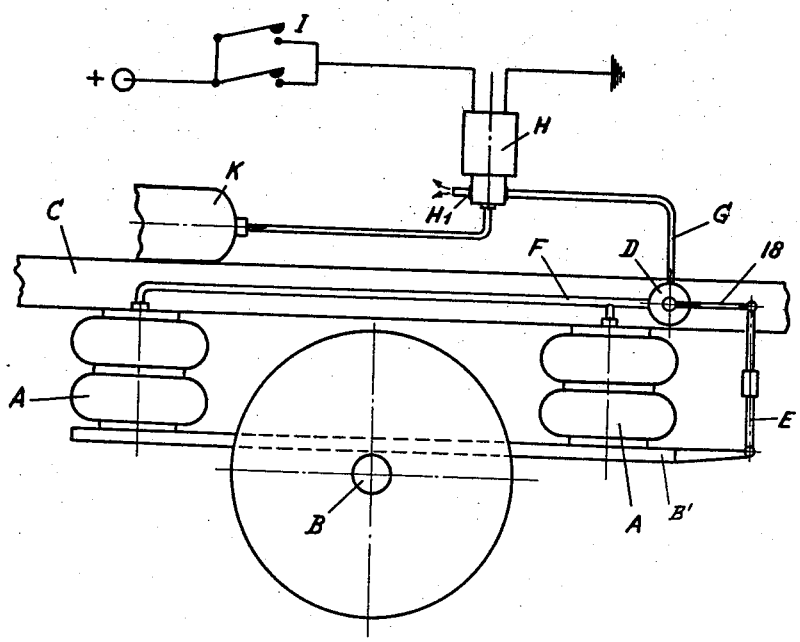
FIG. 1
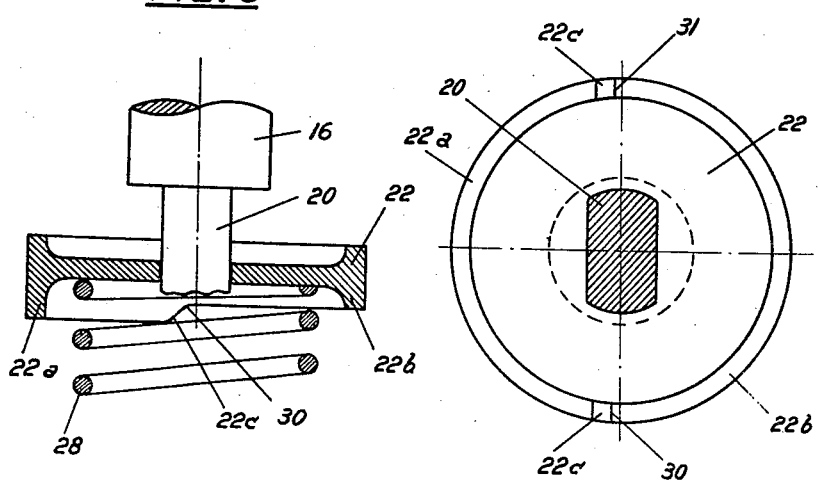
FIG. 3
FIG. 4

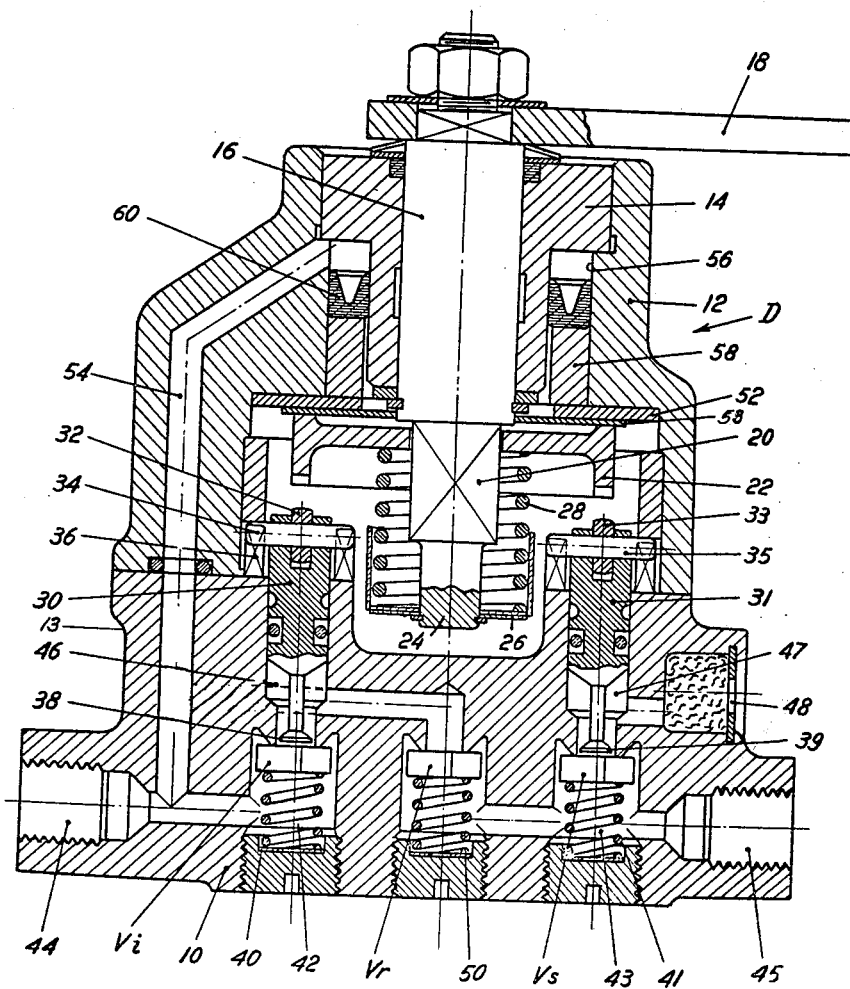

United States Patent Office 3,079,170
Patented Feb. 26, 1963

3,079,170
AIR SPRING CONTROL VALVE FOR MOTOR VEHICLES
Giuseppe Alfieri, Milan, Italy, assignor to Fabbrica Italiana Magneti Marelli S.p.A., Milan, Italy
Filed Apr. 8, 1959, Ser. No. 805,044
Claims priority, application Italy Apr. 12, 1958
4 Claims. (Cl. 280—124)

This invention relates to a control valve for a vehicle air spring suspension system.

The assembly of the present invention comprises, essentially, air springs mounted between the vehicle axle and frame, and a control valve mounted on the vehicle frame for controlling the supply of compressed air to the air spring from a compressed air tank carried by the vehicle, said valve also controlling the exhaust of air from the air springs to the atmosphere. A lever having one end operatively connected to the vehicle axle and the other end connected to the control valve actuates the valve in response to the change in height between the vehicle axle and frame caused by variations in static loads on the vehicle; that is, when loading or unloading goods or passengers on or from the vehicle. The assembly also includes a solenoid valve operatively connected between the compressed air tank and the control valve for preventing the supply or exhaust of air to and from the air springs while the vehicle is underway and subject to variable dynamic loads; that is, when the height between the vehicle axle and frame is changed due to the jounce and rebound of the vehicle; the solenoid valve being energized by suitable switch means connected to the vehicle ignition system or to the vehicle doors.

An object of the invention is to provide improved control valve means for a vehicle air spring suspension system wherein the valve means is actuated for the supply and exhaust of the air springs only in response to the change of static loads on the vehicle.

Another object of the invention is to provide improved control valve means for a vehicle air spring suspension system including a control body having a compressed air inlet, an inlet valve and an exhaust valve positioned within the control body, an oscillatory shaft extending into the control body, cam means carried by the shaft axially slidable thereon and rotatable therewith for actuating the inlet and exhaust valves, and conduit in the control body connecting the compressed air inlet to one face of the cam for sliding the cam on the shaft into an operative position with respect to the inlet and exhaust valves.

Yet another object of the invention is to provide improved control valve means for a vehicle air spring suspension system including a control body formed in two parts, one of the parts containing a compressed air inlet, a connection in communication with the vehicle air spring suspension system, a connection to atmosphere, inlet and exhaust valves, and the other part containing an oscillatory shaft and a cam carried by the shaft axially slidable thereon and rotatable therewith for actuating the inlet and exhaust valves.

Other objects and advantages of the invention will become apparent from the following description taken in connection with the accompanying drawing, wherein:

FIG. 1 is a diagrammatic view of the vehicle suspension system;

FIG. 2 is a sectional view of the control valve;

FIG. 3 is a fragmentary, sectional view of the cam assembly used in the control valve; and FIG. 4 is a top plan view of the cam assembly shown in FIG. 3.

Referring to the drawings, and more particularly to FIG. 1, the vehicle suspension comprises a pair of bellows A mounted between a support B′ secured to the vehicle axle B, and the vehicle frame C. A control valve D is mounted on the vehicle frame for controlling the supply of compressed air from a compressed air reservoir tank K to the bellows A through conduits G and F; the control valve also controlling the exhaust of air from the bellows to the atmosphere. The control valve is provided with a lever 18 connected to one end of a link E, the opposite end of the link being connected to the support B′. By this construction and arrangement, when the weight of the sprung portion of the vehicle is increased, the bellows are compressed; thus, decreasing the distance between the vehicle frame and axle with the resultant turning of the lever 18 thereby actuating the valve to admit additional compressed air from the reservoir to the bellows A, whereby the bellows are extended, thereby returning the frame to its original level with respect to the axle. When the weight of the sprung portion of the vehicle is decreased, the bellows become extended, thereby increasing the distance between the frame and the axle with the resultant turning of the lever 18 to actuate the valve, whereby compressed air is exhausted from the bellows to the atmosphere, thus the frame is returned to its original position with respect to the axle.

A solenoid valve H is interposed between the compressed air reservoir tank K and the levelling valve D, the solenoid valve being energized by switch means I which is actuated by the vehicle ignition assembly or by the vehicle doors. The purpose of the solenoid valve assembly is to render the levelling valve D inoperative when the vehicle is underway but operative when the vehicle has stopped. The use of such a solenoid valve assembly is shown in U.S. Patent 2,869,893 to Sahagian dated January 20, 1959.

Referring to FIG. 2, the improved levelling valve D of the present invention comprises a control body including an upper portion and a lower portion 13. The lower portion has a compressed air inlet port 44 connected to the air reservoir K, a port 45 connected to the bellows A and a port 48 connecting the interior of the control body to the atmosphere. An inlet valve Vi, an exhaust valve Vs, and a check valve Vr are mounted within the lower portion 13 between the ports 44 and 45, the inlet valve being biased to closed position by a spring 40 and adapted to be moved to an open position by a plunger 30 and rod 38 slidably mounted within the lower portion of the control body. A roller 32 is rotatably mounted on the upper end of the plunger by means of a pin 34, the ends of the pin being slidably mounted within guide means 36 formed in the control body.

The exhaust valve actuator has the same construction as the inlet valve actuator; that is, a roller 33 rotatably mounted on one end of a plunger 31, the opposite end of the plunger being provided with a rod 39 for moving the exhaust valve Vs to an open position, said valve being biased to a closed position by a spring 41.

The check valve Vr is normally biased to a closed position by a spring 50 in order to prevent the loss of air from the bellows when the pressure of the air within the bellows is greater than the air pressure within the reservoir tank, the check valve Vr moving to open position when the inlet valve Vi is open and the pressure of the compressed air entering through port 44 is greater than the pressure of the air within the bellows.

Thus, it will be seen that when the inlet valve Vi is open, compressed air from the reservoir tank K will enter port 44, through chamber 42, check valve Vr, through chamber 43 and out through port 45 to the bellows A. When the exhaust valve Vs is moved to open position, air will flow from the bellows, through port 45 into chambers 43 and 47, and then exhaust to atmosphere through port 48, the check valve V$r$ preventing the flow of air back into the reservoir.

In order to actuate the valve actuating plungers 30 and 31, a shaft 16, having one end connected to lever 18, is rotatably mounted within a bearing 14 positioned within the upper portion 12 of the control body, the opposite end portion 20 of the shaft carrying a cam 22 axially slidable thereon and rotatable therewith. A cup-like member 26 is mounted on the end 24 of the shaft 16 and a spring 28 is positioned between the cup member 26 and one face of the cam for biasing the cam upwardly as shown in FIG. 2.

A conduit 54 is formed within the control body connecting the compressed air inlet port 44 to a bore 56 formed within the upper portion 12 of the control body. A tubular plunger 58 is slidably mounted within the bore, one end of the tubular plunger being provided with suitable seal means 60, the opposite end of the tubular member abutting a pair of annular plates 52 and 53 slidably mounted within the control body.

By this construction and arrangement, the pressure of the compressed air flowing through conduit 54 acts upon the seal means 60 thus sliding the plunger 58 together with the annular plates 52 and 53 and cam 22 downwardly into operative position relative to the plunger rollers 32 and 33. When the air pressure is exhausted from the conduit 54, the spring 28 returns the cam 22 to its inoperative position, as shown in FIG. 2.

Referring to FIGS. 3 and 4, the cam 22 comprises a disc, one face thereof being provided with substantially diametrically opposed inclined surfaces 22$c$, the inclined surfaces connecting a semi-circular surface 22$a$ to a semi-circular surface 22$b$. The cam is mounted on the shaft 16 in such a manner that when the cam is moved axially into an operative position, the surface 22$b$ engages the plunger rollers 32 and 33; thus, when the shaft and cam are rotated in one direction, one of the rollers will ride downwardly on one of the inclined surfaces 22$c$ to the surface 22$a$, thereby depressing one of the valve actuating plungers to open the respective valve.

In the operation of the load levelling device, assuming the vehicle is underway, the conduit 54 will be open to the atmosphere through port H$_1$ provided in the solenoid valve H, thus the spring 28 biases the cam 22 upwardly into an inoperative position with respect to the plunger rollers 32 and 33. Therefore, any motion of the lever 18 will impart an idle rotation of shaft 16 and cam 22, whereby there will be no actuation of the supply valve V$i$ or the exhaust valve V$s$.

Assuming the vehicle is stopped and the solenoid valve H is energized by the closing of switch I, compressed air enters the conduit 54 from the compressed air reservoir tank K. The pressure of the compressed air forces the tubular plunger 58 and the cam 22 downwardly so that the cam engages the plunger rollers 32 and 33. While in this position, the cam is adapted to actuate either the supply or exhaust valve in response to rotation of shaft 16 which is rotated by the lever 18 due to the variation of static load on the vehicle, as described hereinabove.

Inasmuch as various modifications and changes in structural details may be made to this invention, it is intended that all matter contained in the foregoing description and shown on the drawing shall be interpreted as illustrative and not in a limiting sense.

I claim:

1. A load leveling device for a pneumatic suspension for motor vehicle bodies or the like comprising: a control body having therein a compressed air inlet operatively connected to a compressed air supply tank, a connection in communication with the pneumatic suspension, and a connection to atmosphere; and oscillating shaft extending into said control body and fixed against axial movement therein; an operating lever rigidly connected at one end to the outer end of said shaft and responsive to the leveling requirements of the motor vehicle or the like; a valve in said control body controlling passage of compressed air from the compressed air inlet to the connection in communication with the pneumatic suspension; a push rod for opening said valve; a second valve in said control body controlling passage of compressed air from the connection in communication with the pneumatic suspension to the connection to atmosphere; and a second push rod for opening said second valve; in combination with a cam carried by said shaft axially slidable thereon and rotatable therewith, said cam having a surface of operative engagement with a substantially 180° development for engaging said respective push rods; a spring holding said cam out of contact with said push rods to permit oscillation of said shaft while said cam remains out of contact with said push rods; a conduit in said control body for connecting the compressed air inlet to the side of said cam away from said push rods to slide said cam axially of said shaft, against the force of said spring, into contact with said push rods, whereupon oscillation of said shaft in one direction operates one of said valves, and oscillation of said shaft in the other direction operates the other of said valves; a tubular plunger surrounding said shaft is positioned at the face of said cam opposite to that upon which said spring acts, a cover secured to said control body, a conduit in said cover communicating with the conduit in said control body whereby the compressed air inlet is connected to the end of said plunger distant from said cam; and a bearing in said cover supporting said shaft, said tubular plunger being positioned between said cover and said bearing.

2. A load leveling device according to claim 1, wherein an annular gasket is interposed between said tubular plunger and the compressed air conduit in said body, and wherein said tubular plunger acts upon said cam through annular plates within said body.

3. A load leveling device according to claim 1, wherein the axes of said shaft and said push rods are parallel.

4. A load leveling device according to claim 3, wherein said control body is formed in two parts, one of said parts containing the compressed air inlet, a connection in communication with the pneumatic suspension, the connection to atmosphere, and said valves, and the other part containing said shaft, said cam, and said tubular plunger.

References Cited in the file of this patent

UNITED STATES PATENTS

| | | |
|---|---|---|
| 1,816,075 | Down | July 28, 1931 |
| 2,655,167 | Dunkelow | Oct. 13, 1953 |
| 2,787,475 | Jackson | Apr. 2, 1957 |
| 2,820,647 | Jackson | Jan. 21, 1958 |
| 2,869,893 | Sahagian | Jan. 20, 1959 |
| 2,923,557 | Schilling | Feb. 2, 1960 |